(12) United States Patent
Alzheimer

(10) Patent No.: US 7,760,533 B2
(45) Date of Patent: Jul. 20, 2010

(54) SYSTEMS, METHODS AND DEVICES FOR ARBITRATING DIE STACK POSITION IN A MULTI-BIT STACK DEVICE

(75) Inventor: Josh Alzheimer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 475 days.

(21) Appl. No.: 11/906,673

(22) Filed: Oct. 2, 2007

(65) Prior Publication Data
US 2009/0085608 A1 Apr. 2, 2009

(51) Int. Cl.
G11C 5/02 (2006.01)

(52) U.S. Cl. .............. 365/51; 365/189.07; 365/191; 365/230.03; 257/777

(58) Field of Classification Search .......... 257/686, 257/773, 777; 365/51, 52, 63, 191, 230.03, 365/189.05, 189.07
See application file for complete search history.

(56) References Cited

U.S. PATENT DOCUMENTS

| | | | |
|---|---|---|---|
| 4,636,986 A | 1/1987 | Pinkham | 365/195 |
| 5,383,156 A | 1/1995 | Komatsu | 365/200 |
| 5,698,895 A | 12/1997 | Pedersen et al. | 257/665 |
| 5,732,027 A * | 3/1998 | Arcoleo et al. | 365/189.05 |
| 6,258,609 B1 | 7/2001 | Farnworth et al. | 438/14 |
| 6,624,506 B2 * | 9/2003 | Sasaki et al. | 257/686 |
| 7,119,549 B2 * | 10/2006 | Lee et al. | 324/601 |
| 7,139,945 B2 * | 11/2006 | Ong | 714/718 |
| 7,327,592 B2 * | 2/2008 | Silvestri | 365/63 |

* cited by examiner

Primary Examiner—Dang T Nguyen
Assistant Examiner—Alexander Sofocleous
(74) Attorney, Agent, or Firm—Dorsey & Whitney LLP

(57) ABSTRACT

Embodiments are described for arbitrating stacked dies in multi-die semiconductor packages. In one embodiment, die identification data for at least two stacked dies are arbitrated to select one of the dies as the primary die and the other as secondary. Each die includes an input/output buffer that drives an output signal to a commonly shared output terminal in response to receiving a die identification data bit as the input signal. Each die also includes an arbitration circuit that generates a control signal in response to the identification bit of one die being mismatched to a corresponding identification bit of the other die. The control signal programs a stack enable fuse in accordance with the arbitration to designate one of the dies as the secondary die.

29 Claims, 4 Drawing Sheets

SYSTEMS, METHODS AND DEVICES FOR ARBITRATING DIE STACK POSITION IN A MULTI-BIT STACK DEVICE

TECHNICAL FIELD

Embodiments of the present invention relate generally to integrated memory devices, and more specifically, to arbitrating stacked dies in multi-die semiconductor packages.

BACKGROUND

The demand for cell phones, PDAs, digital cameras and other electronic devices to be smaller, lighter and more powerful has driven the development of more compact electronic memory device packaging with increased functionality. Stacked die packages include two or more die that are placed on top of each other and are fitted into the same area. Stacked-die packages are often used in products requiring increased memory density and performance in a reduced package size. Within a stacked die memory component, each die in the stack must be individually activated or selected to properly assign various contacts and control pins, such as a DQ pad, a command pad, a chip select pin, and a clock enable pin. Conventionally, the stacked dies are selectively assigned through built-in fuses and antifuses that are programmed before the dies are packaged.

For example, in preparing die for use in a dual die-stack device, die are designated as either a "top" die or a "bottom" die while still in wafer form. Designating devices as either top or bottom die prior to assembly, however, can cause the stacking assembly process to be costly and inefficient. Additionally, each die must be sorted and tracked separately to be paired accordingly, further complicating the assembly process which may add to the cost of manufacturing stacked die devices.

After the die have been designated a stack position and prior to bonding a top die and a bottom die, the die undergo a variety of testing to identify the "good" dies for packaging and the "bad" dies to discard. The good top and bottom die go on to be paired together and packaged. A problem that can result is that the number of good top dies are not equal to the number of good bottom die. As a result, the extra top or bottom dies remain unpaired and may be used in monolithic integrated circuits. However, the bonding configurations would have to be changed from the current stack assignments to match the monolithic configuration, adding steps to the overall assembly process. Stacked die assembly processes are designed to maximize productivity and assembly yield while minimizing yield loss and development time to assemble the completed package.

There is, therefore, a need for programming stack positions of die in multi-die memory devices after packaging.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, and timing protocols have not been shown in detail in order to avoid unnecessarily obscuring the invention.

Figure 1:
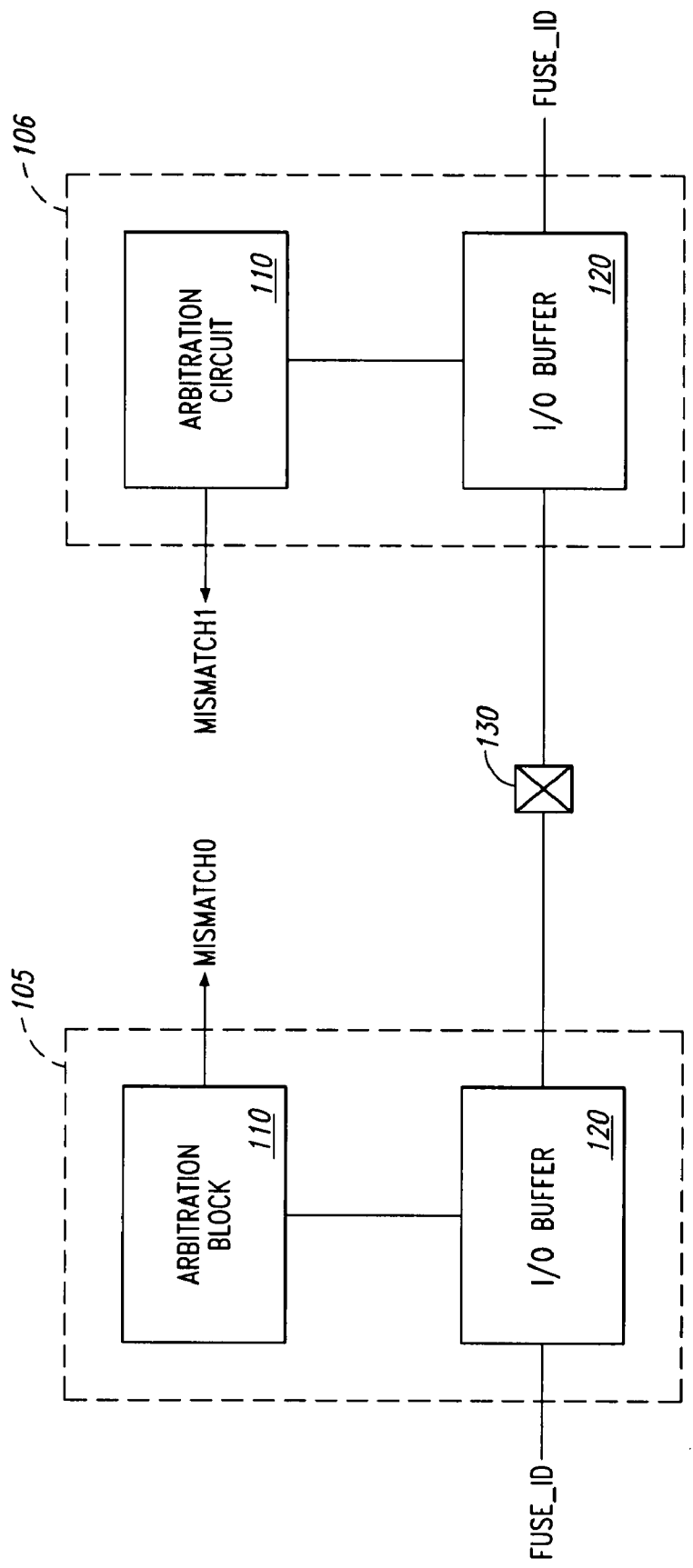
FIG. 1 is a block diagram of a die stack having an arbitration system according to an embodiment of the invention.

FIG. 1 illustrates a portion of a first semiconductor die 105 and a portion of a second semiconductor die 106 in accordance with an embodiment of the invention. In the embodiment shown with reference to FIG. 1, the first and second die 105, 106 represent semiconductor memory devices. However, as will be appreciated by those ordinarily skilled in the art, embodiments of the invention can be implemented in other semiconductor devices as well. As shown, the first and second die 105, 106 are coupled to a common terminal, such as a data input/output terminal. Such an arrangement is found in a dual die stack package 100, for example. In one embodiment, the first and second die 105, 106 are stacked together using through-wafer interconnects (TWI), where every pin is bonded together by holes that are drilled directly through the die bond pad and filled with conductive material, as known. Thus the dies 105, 106 are stacked on top of one another without requiring wire bonds at the edge of each die. Each die 105, 106 includes an arbitration block 110 connected to input/output (I/O) buffers 120. The I/O buffers 120 of each die 105, 106 are additionally coupled to a common data input/output terminal 130.

As previously discussed, the signal pads of each of the die are bonded together. In order to avoid the situation where both die respond to a command provided on common command terminals, each of the die are programmed to respond to a different combination of control signals, such as chip select signal. The die of a dual die stack package are typically programmed by programming a combination of antifuses (e.g., "stack enable fuses") on each of the die prior to assembly, with some die programmed to be a "top" die and other die programmed to be "bottom" die. A pair of top and bottom die are then paired at assembly to form a dual die stack. In contrast to the conventional approach of programming die as either top or bottom die prior to assembly, embodiments of the invention allow programming of the top and bottom die after a dual die stack device has been assembled. As will be described in more detail below, an arbitration block 110 included in a die can be used in designating a stack position for the die in a die stack package after packaging.

In operation, after packaging in a dual die stack package, the first and second die 105, 106 are placed in a test mode in which the I/O buffers 120 and the arbitration blocks 110 are activated. During the test mode, a fuse_ID read operation is issued to both die 105, 106 so that the die 105, 106 concurrently provide the respective fuse_ID to the I/O buffer 120 and the arbitration block 110. As known, die such as 105, 106 are typically programmed with a unique identification encoded by antifuses. The fuse_IDs are typically multiple bits (such as 8 or 16 bits). As the fuse_IDs are provided to the respective I/O buffer 120 to be serially driven onto the common data input/output terminal 130. The arbitration block 110, which is coupled to receive the fuse_ID and the logic value of the common data input/output terminal 130, compares the two bit values for each bit of the fuse_ID. In one embodiment, upon detecting a mismatch between the current fuse_ID bit and the logic value driven onto the common data input/output terminal 130, the arbitration block 110 generates an active MISMATCH signal, which is then used to trigger programming of the stack position in the die. For example, in one embodiment of the invention, a "0" bit of a fuse_ID driven onto the common data input/output terminal 130 will override a "1" bit driven onto the common data input/output terminal 130 by another die. That is, where the current bit of the fuse_ID of the die 105 that is provided to its I/O buffer 120 and the current bit of the fuse_ID of the die 106 that is provided to its I/O buffer 120 is a "0", the logic value on the common data input/output terminal 130 will be a "0". As a result, arbitration block 110 of the die 105 will detect a mismatch between the "1" of its current bit fuse_ID provided to its I/O buffer 120 and the "0" logic value on the common data input/output terminal 130. In response, the arbitration block 110 generates an active MISMATCH0 signal, which indicates a mismatch has been detected, and the I/O buffer 120 of the die 105 ceases driving an output on the common data input/output terminal 130. In the present example, the "losing" die 105 is programmed to have a "bottom" stack position, and in a dual die stack package the "winning" die 106 is programmed to have a "top" stack position.

Figure 2:
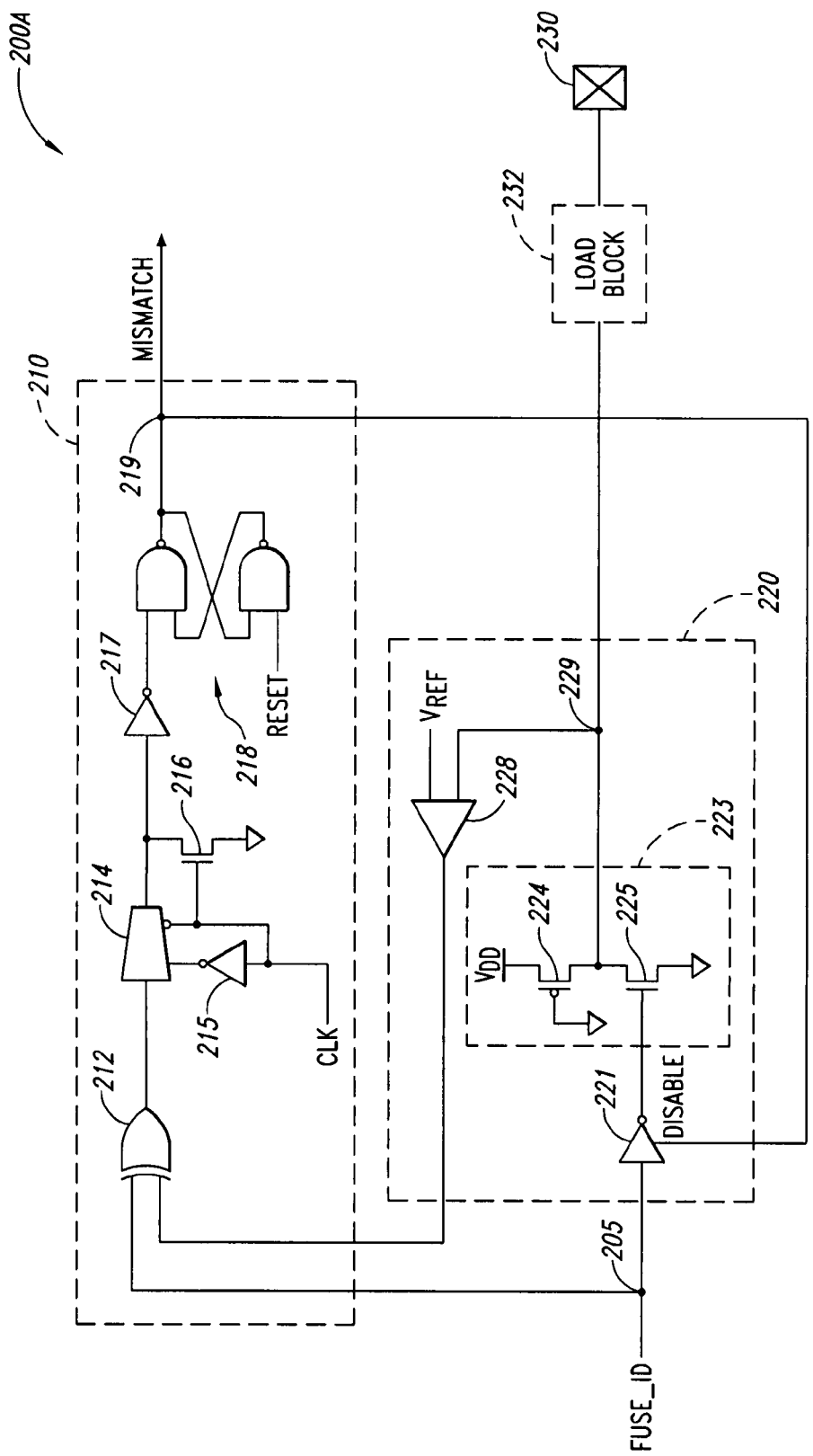
FIG. 2 is a schematic of an arbitration circuit coupled to an I/O driver according to an embodiment of the invention.

FIG. 2 illustrates die circuitry 200A that includes the arbitration block 110 and the I/O buffer 120 of one of the die 105, 106 in greater detail. Operation of the die circuitry 200A is the same for die 105, 106 and the following description applies to both die 105 and 106. As previously described with respect to FIG. 1, the die 105, 106 are coupled to a common data input/output terminal, represented in FIG. 2 as terminal 230. Each die circuitry 200A, B includes an arbitration circuit 210 that determines which die to select and enables a stack_EN fuse to be blown, as previously described. The die circuitry 200A further includes an I/O buffer 220 having an output driver 223 and an input driver 228. A pull-up portion of the output driver 223 is configured in a manner such that the drive strength of the pull-up portion is weaker than the drive strength of a pull-down portion during a stack position assignment test mode. In the embodiment of FIG. 2, the pull-up portion includes a PMOS transistor 224, which may be configured to source a constant current at the weaker drive strength by grounding its gate. Alternatively, the pull-up portion may be disabled by adding an external load resistor or utilizing conventional on-die termination circuitry (ODT) in a load block 232 coupled to an output node 229 of the driver 223. Thus, the pull-up portion of the driver 223 is turned on and sources a constant current but remains inoperable during the test mode. The pull-down portion of the output driver 223 is activated during the test mode, and includes an NMOS transistor 225 having its gate coupled to the output of an inverter 221. The input of the inverter 221, which is also coupled to the input of the arbitration circuit 210 at an input node 205, is coupled to receive a fuse_ID signal that is unique to the particular host die 200A when the fuse_ID read operation is initiated in the test mode, as previously discussed. The driver 223 drives each bit of the fuse_ID signal to the common data input/output terminal 230. An input of an input buffer 228 is coupled to node 229 to receive the logic value of the common data input/output terminal 230 for arbitrating with the fuse_ID signal received by the die 200B. The input buffer 228 generates a buffered output signal corresponding to the logic value by comparing the received signal at node 229 to a reference voltage, as known, which is then provided to the arbitration circuit 210.

An XOR gate 212 in the arbitration circuit 210 receives the fuse_ID signal and the buffered output signal. The XOR gate 212 compares the received inputs and generates a logic output signal that is provided to a transfer gate 214. The transfer gate 214, in response to a clock signal, allows the logic output signal to be propagated to a NAND latch 218 through an inverter 217. The transfer gate 214 is controlled by a clock signal received by an NMOS transistor 216 and an inverter 215. At each falling edge of the clock signal the transfer gate 214 is enabled to properly strobe the logic output signal of the XOR gate 212 to the NAND latch 218 such that the NAND latch 218 is properly latched without false outcomes. The output of the NAND latch 218 provides a DISABLE signal to the inverter 221 which disables operation of the inverter 221 when active. In operation, upon detecting a mismatch between the current bit of the fuse_ID input to the I/O buffer 220 and the logic value of the common data input/output terminal 230, the XOR gate 212 generates a "1" at its output, which is clocked by the transfer gate 214 and provided to the NAND latch 218 through the inverter 217 to generate an active MISMATCH signal. A mismatch occurs when one of the die drives a "0" onto the common data input/output terminal 230. Due to the weaker drive strength of the pull-up portion, a die driving a "0" onto the common data input/input terminal 230 will prevail if another die drives a "1" onto the common data input/output terminal 230. The die attempting to drive the "1" onto the common data input/output terminal 230 but detecting a "0" logic value will have an arbitration circuit 210 that detects the mismatch and generate an active MISMATCH signal. For example, if the die 200A loses the arbitration (by driving a "1" while the other die 200B drives a "0"), a MISMATCH signal is generated by the NAND latch 218 at a node 219. As previously discussed, the MISMATCH signal can be used to trigger programming of the stack position for the die detecting the mismatch. In a dual stack package, the die driving the "0" onto the common data input/output terminal 230 is also programmed to complement the stack position of the die detecting the mismatch.

During operation in the test mode, the dies 200A, B are initialized by configuring the output drivers 223 to activate the pull-down portion, resetting the NAND latch 218 with an active low RESET signal, receiving a clock signal, executing the fuse_ID read, and so on. The fuse_ID signal is received by the input of the inverter 221 as previously described. The inverter 221 pre-drives the fuse_ID signal to the gate of the transistor 225 in the output driver 223. A "0" value of the fuse_ID signals enable the transistors 225 in each die 200A, B, which simultaneously drive the common data input/input terminal 230 low. The low signal is also received by the input buffers 228 at the node 229, and a buffered logic "0" signal is generated. Thus, the XOR gate 212 of each die 200A, B outputs a logic "0" in response to receiving a logic "0" from the input node 205 (i.e., current fuse_ID bit) and a logic "0" from the input buffer 228. The transfer gate 214, in response to a falling edge of the clock signal, propagates the logic low output signal through the inverter 217 to the NAND latch 218 with a logic high input signal. Being reset at the start of the test mode and receiving the logic high input, the initial state of the NAND latch 219 is maintained at a low logic level to provide inactive MISMATCH signals. Therefore, the arbitration circuit 210 compares the next fuse_ID bit.

When the fuse_ID bits are "1", the transistors 225 are disabled and common input/output terminal 230 is driven high due to the constant current source of the transistor 224.

The input buffer 228 buffers the high signal at node 229 to provide a logic "1" signal to the XOR gate 212. The XOR gate 212 in each die 200A, B generates a logic low output signal in response to receiving the logic "1" from the input node 205 and the logic "1" from the input buffer 228. At the next falling edge of the clock signal, the transfer gate 214 passes the high output signal through the inverter 217 to the input of the NAND latch 218. The initial state of the NAND latch 218 is held and the MISMATCH signal is not active. Therefore, an active MISMATCH signal is not generated by either die 200A, B when the fuse_ID bits received by the I/O buffers 220 are the same.

The arbitration circuit 210 repeats the arbitration for each fuse_ID bit that is read until one of the die 200A, B receives a logic "1" signal and the other receives a logic "0". Assume the fuse_ID of the die 200A is the "1" and the fuse_ID of the die 200B is the "0". Thus, the transistor 225 of the driver 223 in the die 200A is not turned on due to its gate receiving the "0" input, and the output node 229 is initially driven high due to the constant current source of the transistor 224. At the same time, the transistor 225 in the die 200B drives the common input/output terminal 230 low due to the fuse_ID signal of the die 200B being received as a logic "0". Since the drive strength of the transistor 225 of the die 200B is greater than the drive strength of the transistor 224 of the die 200A (due to the weaker pull-up) and since the die 200A, B are coupled to the common input/output terminal 230, the node 229 of the die 200A is forced to transition low. Consequently, the input buffer 228 of the die 200A provides a logic "0" to the XOR gate 212. In response to receiving a logic "0" at one input and a logic "1" at the other input, the XOR gate 212 outputs a logic "1". The logic "1" is provided through the inverter 217 as a logic "0" to the NAND latch 218, which causes the NAND latch 218 to change logic states and an active MISMATCH signal to be generated. As previously discussed, the active MISMATCH signal can be used to trigger programming of the die 200A. In the present example, the die 200A is the "loser" of the arbitration and is programmed as the bottom die. The active MISMATCH signal further disables the inverter 221 causing the driver 223 to stop driving the common input/output terminal 230. Although previously described embodiments have been described as using the fuse_ID data for comparison, other embodiments of the invention can utilize different data to provide to the output buffer, for example, a randomly generated sequence of bits.

Figure 3:
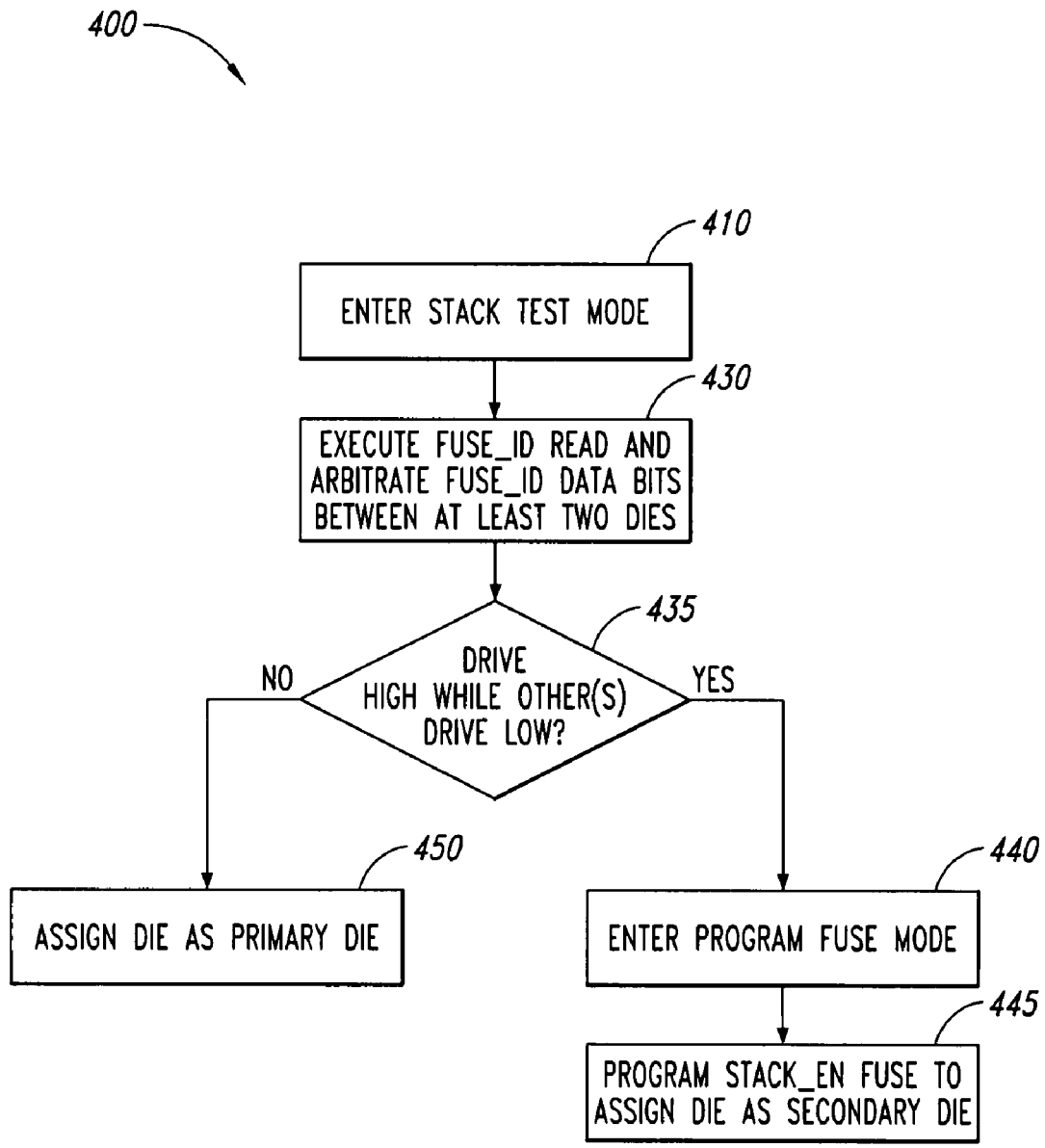
FIG. 3 is a flow chart illustrating the test operation for arbitrating a die stack according to embodiments of the invention.

The test mode operation for the fuse_ID arbitration in die stacks 100 and 200 may be summarized by a flow chart 400 in FIG. 3, illustrating steps for arbitrating a die stack according to embodiments. At step 410, a memory system having a die stack enters a stack test mode. In response, various components of the memory system 400, such as the I/O buffer 220 and the arbitration circuit 210, are initialized in preparation for the arbitration. For example, the pull-down portion of the I/O driver 223 is disabled while the pull-up portion is enabled as previously described. Additionally, the NAND latch 218 may be reset and various other buffers may also be initialized. At step 430, the dies execute a fuse_ID read so that each bit of the fuse_ID between at least two dies are arbitrated as the fuse_ID is streamlined to the I/O buffer 220. The first fuse_ID bit that drives the DQ pad 230 high while all other corresponding bit fuse_IDs are driven low, as shown by step 435, loses the arbitration. Consequently, the losing die enters a program fuse mode at step 440, and a stack enable fuse is blown to assign the losing die as being secondary to the winning die, as shown in step 445. The winning die is assigned as primary and the pins for the winning die are programmed to with normal pads as shown by step 450. Alternatively, as previously described in the case of multiple stacked die, the stack enable fuse may be blown to assign the die that wins to be secondary, and the arbitration is repeated until the last remaining die is selected to be the primary die.

Figure 4:
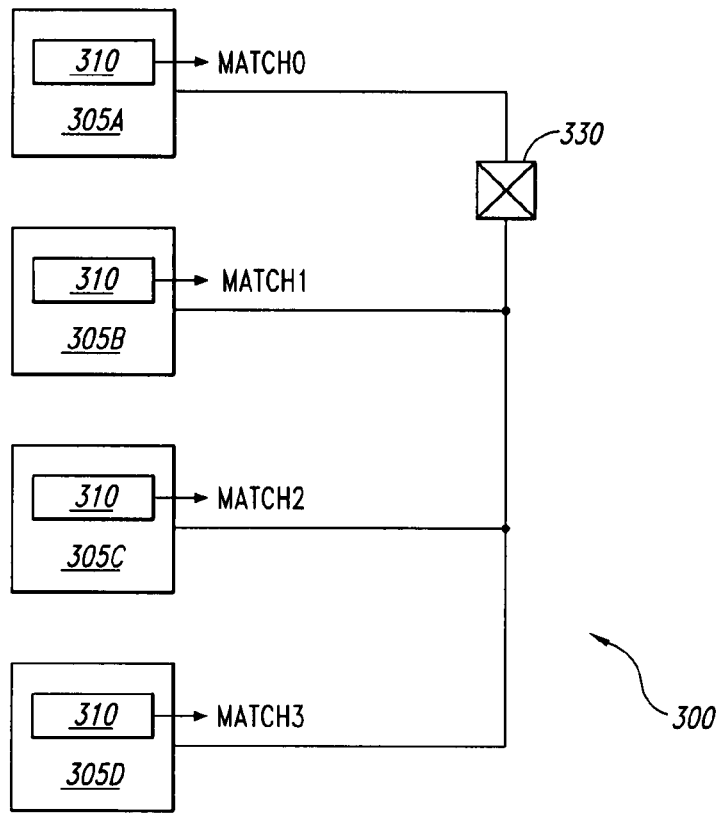
FIG. 4 is a block diagram of a multi-die stacked package according to another embodiment of the invention.

Embodiments of the invention extend to assigning stack positions for die in a multiple stack die device, such as a multiple stack device 300 shown in FIG. 4 having four die stacked. The stack device 300 of FIG. 4 includes four die 305A-D coupled to a common terminal, such as an input/output terminal 330 Each of the die 305A-D includes an arbitration circuit 310 similar to the arbitration circuit 210 of FIG. 2. In contrast to FIG. 2, where the stack position is programmed for "losing" die, the stack positions for the dies 305A-D are programmed for die that win the arbitration. For example, the stack position for the die 305A-D of stack device 300 can be programmed as follows. The four die 305A-D are placed into a test mode in which the I/O buffers and arbitration circuits are activated, as previously described. In the present example, a "0" driven onto the common input/output terminal prevails over a "1." During the test mode, a fuse_ID read operation is issued to die 305A-D so that the respective fuse_IDs are concurrently driven onto the common input/output terminal 330. When an arbitration circuit 310 of one or more of the die 305A-D detects a mismatch between the current bit of the respective fuse_ID and the logic value of the common input/output terminal 330, the "losing" die cease to drive the fuse_ID bit onto the common input/output terminal 330. The process of the losing die ceasing to drive the common input/output terminal 330 continues until a last "winning" die remains. The winning die is programmed to have a first stack position in the multiple stack device 300 and will not participate in any subsequent rounds of the arbitration process. The remaining die are reset and are issued another fuse_ID operation to begin drive the respective fuse_IDs onto the common input/output terminal 330. As before, the losing die cease to drive their fuse_IDs onto the common input/output terminal when encountering a mismatch and the last die continuing to drive the common input/output terminal is considered the winning die. The winning die of the current round of arbitration is then programmed for a second stack position in the multiple stack device 300 and will not participate in any subsequent rounds of the arbitration process. With only two die remaining in the multiple stack device 300 without a programmed stack position, one more arbitration round is necessary. The two remaining die are reset from the previous arbitration round and issued a fuse_ID operation. The first die to detect a mismatch between its current fuse_ID bit and the logic value of the common input/output terminal 330 ceases to drive the common input/output terminal 330 and the other winning die is programmed to have a third stack position in the multiple stack device 300. The last unprogrammed die is then programmed to have a fourth stack position in the multiple stack device 300.

Figure 5:
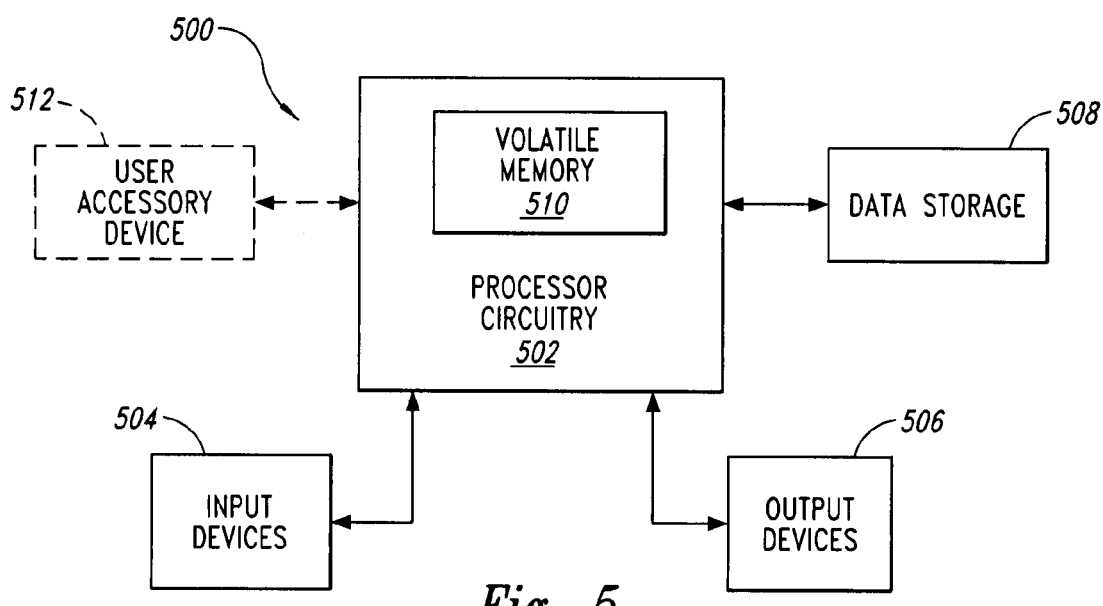
FIG. 5 is a block diagram of a processor-based system that includes a memory device with stacked die packaging according to embodiments of the invention.

FIG. 5 is a block diagram of an embodiment of a processor-based system 500 that includes memory devices having stacked die such as the stacked die devices 100, 300 of FIGS. 1 and 4, according to embodiments of the invention. Conventionally, the processor circuitry 502 is coupled through address, data, and control buses to a volatile memory device 510 to provide for writing data to and reading data from the volatile memory device 510. The processor circuitry 502 includes circuitry for performing various processing functions, such as executing specific software to perform specific calculations or tasks. In addition, the processor-based system 500 may include one or more input devices 504, such as a keyboard or a mouse, coupled to the processor circuitry 502 to allow an operator to interface with the processor-based system 500. Typically, the processor-based system 500 may also include one or more output devices 506 coupled to the processor circuitry 502, such as output devices typically including a printer and a video terminal. One or more data storage devices 508 are also typically coupled to the processor-based circuitry 502 to store data or retrieve data from external storage media (not shown). Examples of typical storage devices 508 include hard and floppy disks, tape cassettes, compact disk read-only ("CD-ROMs") and compact disk read-write ("CD-RW") memories, and digital video disks ("DVDs"). Data storage devices 508 may also include devices to store data that is to be retained even when power is not supplied to the processor-based system 500 or the data storage devices 508, such as a flash memory device (not shown) according to some other examples of the invention. Flash memory, like volatile memory, may be packaged in a variety of ways, including stacked die packaging as described in one or more of the embodiments above.

FIG. 5 may alternatively have a user accessory device 512, such as a cell phone, digital camera or other hand-held device, coupled to the processor 502. The processor 502 may be a microprocessor, digital signal processor, or part of a central processing unit that communicates with the user accessory device 512 over a bus. The processor 502 may additionally have a nonvolatile memory such as flash memory, or rely on the data storage device 508. Alternatively, the user input device 512 may include a random access memory (RAM memory) or flash memory to which the processor communicates over the bus. In either case, the RAM memory and the flash memory may be packaged having the stacked die devices in accordance with the embodiments described above.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A stacked die device having a plurality of semiconductor devices, comprising:
   an electrical node;
   a first semiconductor device having a plurality of terminals, one of which is coupled to the node, the first device having an output buffer configured to generate and provide an output signal to the terminal coupled to the node in response to an input signal, the first device further having an arbitration circuit coupled to the input of the output buffer and the node and configured to compare the logic states of the input signal and the node and generate a signal indicative of a mismatch; and
   a second semiconductor device having a plurality of terminals, one of which is coupled to the node, the second device having an output buffer configured to generate and provide an output signal to the terminal coupled to the node in response to an input signal, the second device further having an arbitration circuit coupled to the input of the output buffer and the node and configured to compare the logic states of the input signal and the node and generate a signal indicative of a mismatch.

2. The stacked die device of claim 1 wherein the first and second devices include a plurality of antifuses programmed with an identification code and the devices further include antifuse read circuits configured to generate signals corresponding to the identification code and provide the same the output buffer in response to an antifuse read operation.

3. The stacked die device of claim 1 wherein a plurality of command terminals of the first semiconductor device are coupled to a corresponding command terminal of the second semiconductor device.

4. The stacked die device of claim 1 wherein the arbitration circuits of the first and second devices comprise:

a comparison circuit coupled to the input of the output buffer and the node and configured to compare the logic states of the input signal and the node and generate an output signal having a first logic state in response to detecting a mismatch in logic states and having a second logic state in response to detecting matching logic states; and
a latch circuit coupled to the comparison circuit and configured to generate an output signal indicating a mismatch between the logic states of the input signal in response to the output signal having the first logic state.

5. The stacked die device of claim 1 wherein the first and second devices include antifuses configured to be programmed with stack position information based on the comparison of the arbitration circuit and the first and second devices further include control circuits configured to enable the respective device in response to a combination of command signals in accordance with the stack position information.

6. A semiconductor stacked die device, comprising:
   a host die having a first identifier signal, the first die being coupled to an output terminal; and
   at least another die stacked over the host die, the at least another die having a second identifier signal and being coupled to the output terminal, each of the dies comprising:
   an input/output buffer having an input terminal that receives the identifier signal from the respective die, the input/output buffer operable to drive an output signal to the output terminal in response to receiving the identifier signal; and
   an arbitration block coupled to the input/output buffer, the arbitration block operable to receive and compare the identifier signal and the output signal, the arbitration block further operable to generate a control signal responsive to the identifier signal of its host die being mismatched to the identifier signal of the at least another die and the output signal of the at least another die overriding the output signal of the host die at the output terminal.

7. The semiconductor stacked die device of claim 6 wherein the host die and the at least another die provides the respective identifier signal to the input/output buffer responsive to entering a stacked die test mode of operation.

8. The semiconductor stacked die device of claim 7 wherein the stacked die test mode of operation is initialized after the stacked die device has been assembled.

9. The semiconductor stacked die device of claim 6 wherein the control signal is a fuse control signal configured to blow a stack enable fuse that assigns the host die to a secondary die pad configuration.

10. The semiconductor stacked die device of claim 9 wherein the first and second identifier signals comprise multiple bits and the arbitration block comprises arbitrating the first and second identifier signals one bit at a time.

11. The semiconductor stacked die device of claim 10 wherein the arbitration block generates the control signal responsive to a clock signal when a bit of the first identifier signal has a logic value that is opposite to the logic value of a corresponding bit of the second identifier signal.

12. The semiconductor stacked die device of claim 6 wherein the host die and the at least another die have the same die configuration and are assembled from the same wafer.

13. The semiconductor stacked die device of claim 12 wherein the at least another die is stacked over the host die using through-wafer interconnects.

14. A plurality of stacked dies in a memory device, each of the stacked die comprising:
an input terminal configured to receive an input signal;
an output terminal coupled to at least another stacked die in the plurality of stacked dies;
an output driver configured to receive the input signal and operable to drive an output signal to the output terminal in response to the input signal; and
an arbitration circuit coupled to the output driver and the input terminal, the arbitration circuit having a logic gate and a latch circuit, the logic gate of the arbitration circuit operable to compare the input signal and the output signal, and further operable to enable the latch circuit to latch a stack control signal when the drive strength of the output driver is less than the driver strength of an output driver of the at least another stacked die.

15. The memory device of claim 14 wherein the output driver comprises a pull-up portion and a pull-down portion, the pull-down portion of the output driver having a drive strength that is greater than the pull-up portion.

16. The memory device of claim 15 wherein the pull-up portion of the output driver is deactivated by a load circuit.

17. The memory device of claim 16 wherein the load circuit comprises an on-die termination circuit.

18. The memory device of claim 14 wherein the arbitration circuit is enabled when the memory device is in a test mode of operation after the device has been packaged.

19. The memory device of claim 18 wherein the logic gate comprises an XOR gate and the latch circuit comprises a NAND latch, the XOR gate being configured to trigger the NAND latch when the input signals of the XOR gate are different.

20. The memory device of claim 19 wherein the stack control signal enables a stack enable fuse to be blown, wherein the blown stack enable fuse assigns pins of the respective die secondary to the at least another stacked die in the plurality of stacked dies.

21. A processor-based system comprising:
a data input device;
a data output device;
a plurality of buses to and from the data input, output and storage devices;
processor circuitry coupled to the data input, output and storage devices, the processor circuitry operable to process data to and from the data input and output devices on the plurality of buses; and
at least one multi-die memory device comprising:
a host die having a first input signal, the first die being coupled to the processor circuitry and to an output terminal coupled to at least one of the plurality of buses; and
at least another die stacked on top of the host die, the at least another die having a second input signal and being coupled to the processor circuitry and to the output terminal of the host die, each of the dies comprising:
an input/output buffer having an input terminal to receive the input signal from the respective die, the input/output buffer operable to drive a first output signal to the output terminal responsive to receiving the first input signal; and
an arbitration circuit coupled to the input/output buffer, the arbitration circuit, responsive to a test mode of operation, configured to receive the respective first input signal and the first output signal, the arbitration circuit operable to compare the received signals and generate a fuse control signal responsive to the first input signal of the host die being mismatched to the second input signal of the at least another die and the second output signal of the at least another die overriding the first output signal of the host die at the output terminal.

22. The processor-based system of claim 21 wherein the fuse control signal blows a stack enable fuse, wherein the blown stack enable fuse assigns pins of the respective host die secondary to the at least another stacked die.

23. The processor-based system of claim 21 wherein the at least one multi-die memory device comprises a multi-die flash memory device.

24. A method of programming pins of at least two semiconductor dies, comprising:
driving a first output signal at a first drive strength in response to receiving a first input signal;
driving a second output signal at a second drive strength in response to receiving a second input signal;
arbitrating between the first and second input signals to determine which of the first and second output signals is generated from the stronger drive strength; and
latching a fuse control signal to program a stack enable fuse that designates a primary die assignment and a secondary die assignment based on the arbitration.

25. The method of claim 24 wherein arbitrating between the first and second input signals occurs after the at least two semiconductor dies have been stacked and packaged.

26. The method of claim 24 wherein the fuse control signal is latched to configure the secondary die assignment to the die that generates the losing output signal in the arbitration.

27. A method of assigning pins of a stacked multi-die semiconductor device, comprising:
entering a stack test mode of operation;
simultaneously executing a first die identification read operation and at least a second die identification read operation in response to entering the stack test mode of operation;
arbitrating data bits between the first die identification and the at least second die identification to determine a data bit in the first die identification having a value that is opposite to a value of a corresponding data bit in the second die identification;
selecting one of the data bits as losing the arbitration;
entering a program fuse mode of operation in response to selecting the losing bit; and
programming a stack enable fuse to assign a secondary pin assignment to the losing bit.

28. The method of claim 27 wherein the data bits of the respective die identification are input signals to respective output drivers, and wherein the output drivers generate output signals at different drive strengths responsive to respective opposite values of the data bits such that the output signal from one data bit has magnitude that is greater than the output signal of the opposite data bit.

29. The method of claim 27 wherein arbitrating data bits between the first die identification and the at least second die identification comprises repeating the arbitration for comparing a plurality of die identifications corresponding to a plurality of dies in a stack, wherein each repeated arbitration compares two die identifications at a time until the pins of the remaining plurality of dies are assigned.

* * * * *